Nov. 23, 1926.
C. O. GUERNSEY
CLUTCH OPERATING MECHANISM
Filed March 5, 1925
1,608,277
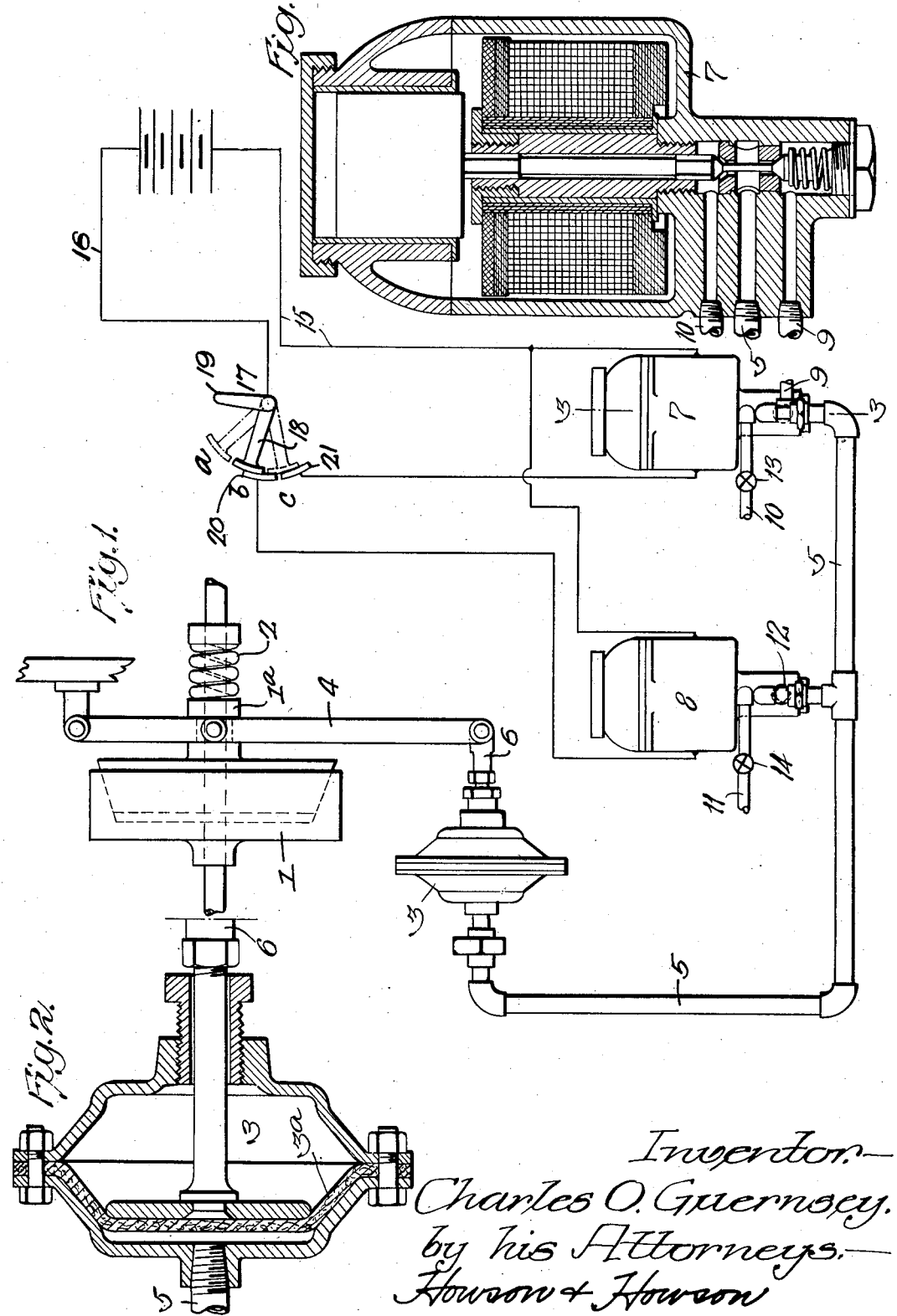
Inventor.—
Charles O. Guernsey.
by his Attorneys.—
Howson & Howson Patented Nov. 23, 1926.

1,608,277

UNITED STATES PATENT OFFICE.

CHARLES O. GUERNSEY, OF PHILADELPHIA, PENNSYLVANIA.

CLUTCH-OPERATING MECHANISM.

Application filed March 5, 1925. Serial No. 13,411.

This invention relates particularly to clutch operating mechanisms adapted for use on railway cars or coaches which are driven by means of internal combustion engines. It will be understood, however, that while the invention is particularly intended for this class of service, it is by no means so limited.

The principal object of the invention is to provide an operating mechanism for the clutch which will require a minimum of effort on the part of the operator, which will serve to engage the clutch gradually and without shock, and which is simple in construction and reliable in operation. Other objects of the invention will be apparent from the following specification and claims.

In the accompanying drawing I have shown the embodiment of the invention which I now deem preferable, but it will be understood that various changes and substitutions can be made within the scope of the claims without departing from the spirit of the invention.

Fig. 1 shows my improved operating clutch mechanism with certain of the parts indicated diagrammatically; Fig. 2 is a longitudinal sectional elevation of a detail of the invention; and Fig. 3 is a sectional elevation of another detail of the invention, taken along the line 3—3 of Fig. 1.

Referring to the drawing, 1 represents the main power transmitting clutch of the railway car or other vehicle. I do not limit myself to any one type of clutch, but for convenience of illustration I have shown a cone clutch. A suitable clutch operating member is provided and as illustrated this takes the form of a hub 1$^a$. Movement of this member serves to engage and disengage the clutch, and preferably a spring 2 is provided which tends to move the member 1$^a$ in one direction and thus hold the clutch in its engaged position.

In order to move the clutch operating member 1$^a$ in the opposite direction, a suitable pneumatic operating device 3 (Figs. 1 and 2) is provided which is connected to said member by means of a lever 4. The device 3 does not of itself constitute any part of my invention and it may be of any usual or preferred construction. For instance, a flexible diaphragm 3$^a$ may be provided, which is adapted to be engaged by compressed air or other elastic fluid on one side and which is connected at the other side with the lever 4 by means of a rod or link 6.

Air is admitted to and exhausted from the pneumatic operating device 3 by means of a pipe 5. For controlling the flow of air through the pipe 5, two similar valves, 7 and 8, are provided, (Figs. 1 and 3) each of them being connected directly with the pipe 5 as shown. The valve 7 is also connected with a supply pipe 9 and an exhaust pipe 10. The valve 8 is connected with an exhaust pipe 11 but its normal inlet connection is omitted, or plugged as indicated at 12. Preferably the exhaust pipes 10 and 11 have restricted outlets for a purpose to be hereinafter described. I have shown for this purpose adjustable reducing valves 13 and 14.

The valve 7 is so constructed that either the supply pipe 9 or the exhaust pipe 10 can be connected with the pipe 5. The valve 8 is similarly constructed but, as already stated, it has no connection with the supply pipe. If the valves 7 and 8 are in position to connect both of the exhaust pipes, 10 and 11, with the pipe 5, the pneumatic device 3 will be inoperative and the clutch 1 will be held in its engaged position by the spring 2. In practice the valve 8 is first moved to close the exhaust pipe 11. Thereafter the valve 7 is moved to close the exhaust pipe 10 and open the supply pipe 9. This permits compressed air to enter pipe 5 and the operating device 3, thus disengaging the clutch.

When it is desired to again engage the clutch the valve 7 is moved to close the supply pipe 9 and open the exhaust pipe 10. Inasmuch as the pipe 10 has a restricted outlet, as already stated, the air is exhausted relatively slowly from the operating device 3 and the clutch is engaged slowly. If it is desired to engage the clutch more rapidly, the operator also moves valve 8 to open the exhaust 11, which also has a restricted outlet as stated. With both exhaust pipes open the clutch is engaged much more rapidly. While I have shown only two valves, 7 and 8, it will be understood that any desired number may be used in order to obtain any desired variation in the amount of the exhaust and in the rate with which the clutch is engaged.

Preferably the valves, 7 and 8, are so constructed as to be controlled electro-magnetically. The details of construction of these electro-magnetic valves form no part of the present invention, and any usual or preferred construction can be used. As illustrated, the construction is such that the supply inlets are connected with the pipe 5 when the valves are energized, and that the exhaust outlets are connected with the pipe 5 when the valves are de-energized.

Electric supply conductors are indicated at 15 and 16, the conductor 15 being connected directly with the electro-magnetic valves, and the conductor 16 being connected therewith through a controller 17. The controller has a contact arm 18 manually movable by means of a lever 19 into any one of three positions indicated by $a$, $b$, and $c$ respectively. At the position "$a$" the circuit is entirely broken and the valves are in position to connect pipe 5 with both exhausts. At the position "$b$" connection is made through a contact 20, which energizes the valve 8 to close the exhaust 11. At the position "$c$" connection is made not only through the contact 20 but also through a contact 21 to energize both valves, thus closing both exhausts and connecting the supply pipe 9 with pipe 5.

With the controller in the position "$c$" the pneumatic operating device 3 acts to disengage the clutch. When the controller is moved from the position "$c$" to the position "$b$," the supply pipe 9 is closed and the exhaust pipe 10 is open. This permits the clutch to be slowly engaged. If the operator desires to engage the clutch more rapidly he can move the controller immediately from the position "$c$" to the position "$a$." In this latter position both of the exhaust pipes, 10 and 11, will be open and the clutch will be engaged relatively rapidly.

By means of this construction the operator by means of the single lever 19 can cause the clutch to be engaged or disengaged, and he can vary the rate of engagement in accordance with the operating conditions of the car or other vehicle.

What I claim is:

1. The combination in a mechanism of the type described, of a clutch; a control member movable to engage or disengage the clutch; means for automatically moving the said member in one direction to engage the clutch; a pneumatic device for moving the said member in the other direction for positively disengaging the clutch; valve means for selectively connecting the said device with a motive fluid supply or with a restricted exhaust; and adjustable means independent of said valve means for varying the amount of restriction of the exhaust.

2. The combination in a mechanism of the type described, of a clutch; a control member movable to engage or disengage the clutch; means for automatically moving the said member in one direction to engage the clutch; a pneumatic device for moving said member in the direction to disengage the clutch; valve means for controlling the said device and a single manually movable lever for operating the valve means to connect the said device with an air supply and to connect it with an exhaust; and adjustable means independent of said valve means adapted to vary the amount of restriction of the exhaust.

3. In a clutch operating mechanism, the combination with a clutch, a member movable to engage or disengage the clutch and means for automatically moving the said member in one direction, of a pneumatic device for moving the said member in the other direction, a valve for connecting the said device with an air supply or with a restricted exhaust, at least one additional valve for also connecting the said device with a restricted exhaust, and means adapted to operate the valves successively but independently one of the other.

4. In a clutch operating mechanism, the combination with a clutch, a member movable to engage or disengage the clutch and means for automatically moving the said member in one direction, of a pneumatic device for moving the said member in the other direction, a valve for connecting the said device with an air supply or with a restricted exhaust, at least one additional valve for also connecting the said device with a restricted exhaust, and electro-magnetic means for operating the valves successively.

5. In a clutch operating mechanism, the combination with a clutch, a member movable to engage or disengage the clutch and means for automatically moving the said member in one direction, of a pneumatic device for moving the said member in the other direction, a valve for connecting the said device with an air supply or with a restricted exhaust, at least one additional valve for also connecting the said device with a restricted exhaust, and a single lever adapted to operate the valves successively but independently one of the other.

6. The combination of a power transmitting clutch, a spring tending to hold the clutch engaged, a pneumatic device for disengaging the clutch, a valve for connecting the said device with an air supply or with a restricted exhaust, at least one additional valve for also connecting the said device with a restricted exhaust, and means adapted to operate the valves successively but independently one of the other.

7. The combination in a mechanism of the type described of a clutch, a control member movable to engage or disengage the clutch, means for automatically moving the said member in one direction, a pneumatic device for moving the said member in the other direction, two similar electro-magnetic valves connected with the said device, one of the said valves having a connection to an air supply and also to a restricted exhaust, and the other of the said valves having only a connection to a restricted exhaust and electric connections for the said valves whereby they may be operated successively.

CHARLES O. GUERNSEY.